US008406940B2

(12) United States Patent
Otsubo et al.

(10) Patent No.: US 8,406,940 B2
(45) Date of Patent: Mar. 26, 2013

(54) METHODS AND SYSTEMS FOR MAPPING RAILROAD TRACKS

(75) Inventors: Tom Otsubo, Oak Grove, MO (US); Wolfgang Daum, Erie, PA (US); Craig Alan Stull, Kansas City, MO (US); Gerald Hess, Erie, PA (US); Andrew David Caple, Bates City, MO (US); Misty McCrea Chambers, Lees Summit, MO (US); Jason G. White, Leawood, KS (US); Robert Allen Coker, Foristell, MO (US); John Gregory Zimmerman, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 1377 days.

(21) Appl. No.: 11/971,709

(22) Filed: Jan. 9, 2008

(65) Prior Publication Data

US 2009/0177401 A1 Jul. 9, 2009

(51) Int. Cl.
*G05D 1/00* (2006.01)

(52) U.S. Cl. ............ 701/19; 701/20; 701/409; 701/412; 701/454; 701/461; 701/532; 702/5; 702/85; 702/94; 246/122 R; 246/322; 33/287; 33/651

(58) Field of Classification Search ..................... 701/19
See application file for complete search history.

(56) References Cited

U.S. PATENT DOCUMENTS 4,691,565 A 9/1987 Theurer
5,740,547 A * 4/1998 Kull et al. ........................ 701/19
5,986,547 A 11/1999 Korver et al.
5,987,979 A 11/1999 Bryan
6,044,698 A 4/2000 Bryan
6,195,023 B1 2/2001 Walsh et al.
6,373,403 B1 4/2002 Korver et al.
6,697,752 B1 2/2004 Korver et al.
6,804,621 B1 10/2004 Pedanckar
7,130,753 B2 10/2006 Pedanekar
2005/0192720 A1 9/2005 Christie et al.
2006/0058957 A1 3/2006 Hickenlooper et al.
2006/0253233 A1* 11/2006 Metzger .......................... 701/19
2007/0150130 A1* 6/2007 Welles et al. ................... 701/19
2009/0177401 A1* 7/2009 Otsubo et al. ..................... 702/5

FOREIGN PATENT DOCUMENTS

WO 2006052676 A2 5/2006

OTHER PUBLICATIONS

PCT, International Search Report, for PCT/US2008/085620, dated Oct. 3, 2009.

* cited by examiner

*Primary Examiner* — Redhwan k Mawari
(74) *Attorney, Agent, or Firm* — GE Global Patent Operation; John A. Kramer

(57) ABSTRACT

A method for mapping a railroad track is provided. The method includes defining a plurality of track segments that form the railroad track and determining coordinates of each track segment. The method also includes storing the coordinates of each track segment in a database as map segments and linking the map segments stored in the database to create a multi-dimensional railroad track map.

5 Claims, 3 Drawing Sheets

300 302

306 Define Track Segments

350 Determine Landmarks and Switches to be Mapped

360 Survey the Railroad Track

362 Determine the Co-ordinates of the Track

390 Store the Track Segments and their Respective Co-ordinates

392 Link the Track Segments to Form a Multi-Dimensional Map

400 Update the Multi-Dimensional Map

METHODS AND SYSTEMS FOR MAPPING RAILROAD TRACKS

BACKGROUND OF THE INVENTION

This invention relates generally to railroads, and more specifically, to methods and systems for mapping railroad tracks.

At least some railroad tracks are mapped using known two-dimensional mapping technology that maps only the mainline track and establishes an offset distance for parallel tracks, and uses a single reference location for this mainline track. Specifically, two-dimensional mainline mapping enables a track to be mapped by determining the longitudinal and latitudinal coordinates of a plurality of points along a mainline track. Distances along this mainline track map are referenced to a single location for determining location of a train. The purpose for establishing offset distances to parallel tracks reduces the data storage and processing requirements for the system. The data points representing the track map are stored in a database and are used to form a linear map based on the distance defined between pairs of points. Accordingly, the linear map can be used to determine a distance traveled on the track. However, two-dimensional mainline mapping is limited to linear mapping, and as such is only capable of linearly mapping tracks that extend in a single direction (for example the x-direction), and is not capable of mapping tracks that extend in multiple directions (for example the x, y, and/or z-directions).

Using two-dimensional mainline mapping with a single reference point to map a complex structure may result in discrepancies when determining a distance traveled on the railroad. For example, a siding track may curve and extend in the x and y-directions relative to the mainline. Accordingly, to travel a distance "1000" in the x-direction, a train traveling on the track may have to travel a distance greater than "1000". Further, a train may travel a distance greater than "1000" along a complex track, but never reach a distance "1000" in the x-direction. In another example, a train may start at a location "0", travel through a loop a distance "1000", and return to location "0". Using a two-dimensional mapping system with a single reference point, the train would be assumed to have only traveled a distance "0" despite actually traveling a distance "1000". Accordingly, the results obtained using two-dimensional mainline track mapping to map complex railroad tracks can be limited.

BRIEF DESCRIPTION OF THE INVENTION

In one embodiment, a method for mapping a railroad track is provided. The method includes defining a plurality of track segments that form the railroad track and determining coordinates of each track segment. The method also includes storing the coordinates of each track segment in a database as map segments and linking the map segments stored in the database to create a multi-dimensional railroad track map.

In another embodiment, a system for mapping a railroad track is provided. The system includes a positioning system configured to determine coordinates of a plurality of track segments that form the railroad track, wherein the plurality of track segments include at least one of a curved section of track, a substantially linear section of track, a turning track, a loop, and a siding. The system also includes a database configured to store the coordinates of each track segment as map segments, and a processor configured to link the map segments to create a multi-dimensional railroad track map.

In yet another embodiment, a computer program embodied on a computer-readable medium is provided. The computer program includes at least one code segment that is configured to instruct a computer to determine coordinates of a plurality of track segments that form a railroad track, wherein the plurality of track segments include at least one of a curved section of track, a substantially linear section of track, a turning track, a loop, and a siding. The computer program also includes at least one code segment that is configured to instruct a computer to create a multi-dimensional railroad track map based on the coordinates of the plurality of track segments.

DETAILED DESCRIPTION OF THE INVENTION

The present invention provides a system that may be used to map a railroad track. Specifically, in the exemplary embodiment, the system determines coordinates of a plurality of track segments that form the railroad track, stores the coordinates as map segments, and links the map segments together to create a multi-dimensional railroad track map. Moreover, in the exemplary embodiment, the track segments are determined by landmarks on the track. For example, in one embodiment, each track segment is defined by changes in a direction of the track. As such, the track segments may include at least one curved section of track, a substantially linear section of track, a turning track, a loop, and a siding, wherein a siding is defined as a track that is coupled to and positioned parallel to a main track. The present invention also provides a computer program embodied on a computer readable medium that includes at least one code segment configured to instruct a computer to map a railroad track, as described in more detail herein.

It should be noted that although the present invention is described with respect to railroad tracks, as will be appreciated by one of ordinary skill in the art, the present invention may also be used to map any geographical landmark. Further, although the present invention is described with respect to processors and computer programs, as will be appreciated by one of ordinary skill in the art, the present invention may also apply to any systems and/or programs that are capable of mapping a geographical landmark. For example, as used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as, a floppy disk drive or compact disc-read-only memory (CD-ROM) drive, for reading data from a computer-readable medium, such as a floppy disk, a CD-ROM, a magneto-optical disk (MOD), or a digital versatile disc (DVD).

Figure 1:
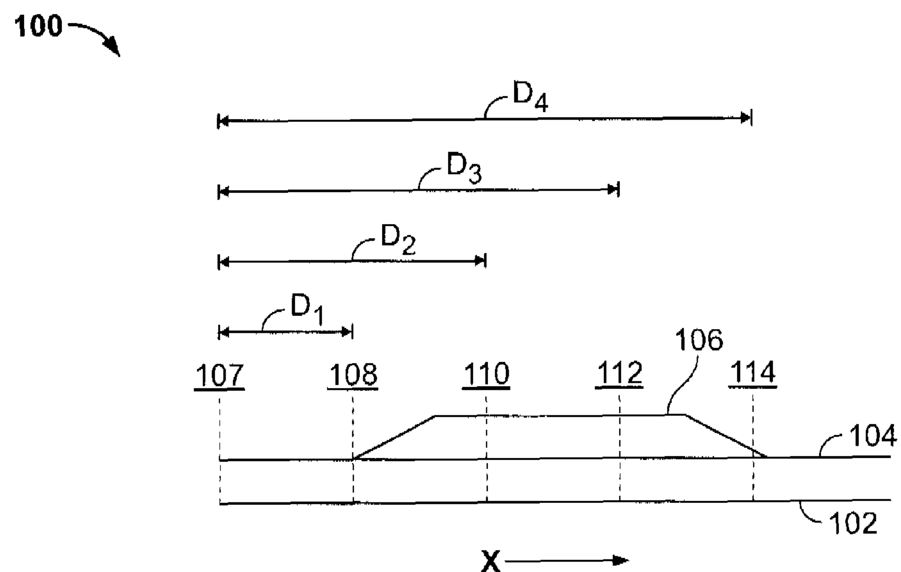
FIG. 1 is a schematic illustration of an exemplary railroad track that can be mapped using existing two-dimensional mapping technology with a single reference point.

FIG. 1 is a schematic illustration of a railroad track 100 that can be mapped using existing two-dimensional mainline mapping with single reference point technology. Specifically, FIG. 1 illustrates a railroad track 100 including a pair of parallel tracks 102 and 104 and a siding 106. Because tracks 102 and 104, and siding 106 are each parallel, they are capable of being mapped using mainline mapping with single reference point mapping. Specifically, both tracks 102 and 104 begin at a starting location 107 and extend linearly in the x-direction through locations 108, 110, 112, and 114. Starting location 107 is used as a reference position "0", and locations 108, 110, 112, and 114 are each a respective distance $D_1$, $D_2$, $D_3$, and $D_4$ from location 107 in the x-direction. In the exemplary embodiment, location 108 represents a distance "1000", location 110 represents a distance "3000", location 112 represents a distance "4000", and location 114 represents a distance "5000". Further, because siding 106 is parallel to tracks 102 and 104, distances "3000" and "4000", in the x-direction, can also be represented on siding 106.

Accordingly, two-dimensional mainline track mapping is capable of linearly mapping tracks that extend substantially parallel from the same starting location. However, accurate two-dimensional track mapping maybe limited to such capabilities. In particular, because two-dimensional mainline track mapping only maps the mainline, the methods lack a capability to distinguish parallel tracks. For example, when a train is positioned at location 110, using mainline track mapping methods, there is no way no know whether the train is on track 102, track 104, or siding 106 because railroad 100 has only been mapped on the mainline and has not been mapped in the parallel tracks.

Figure 2:
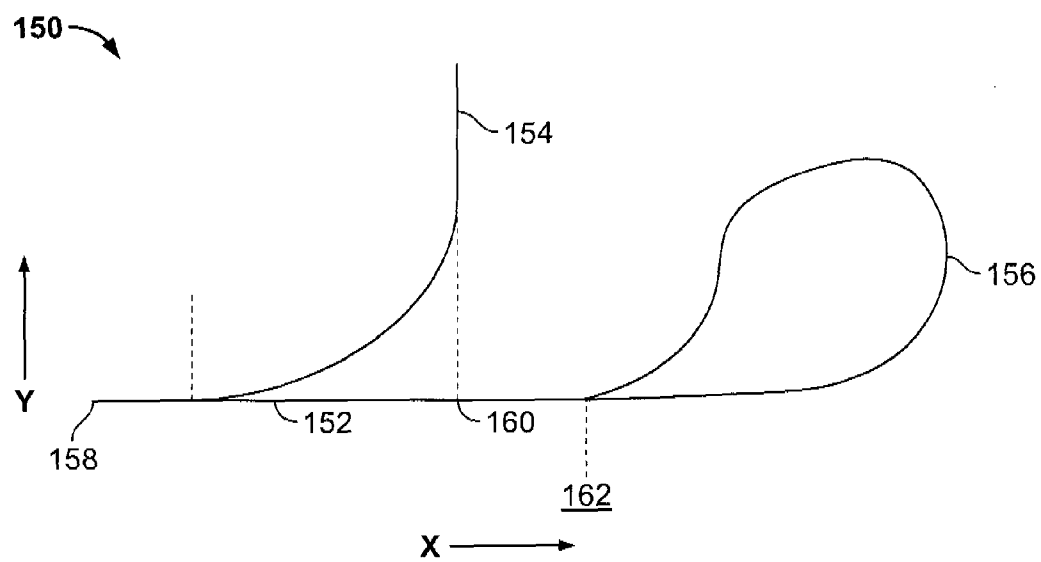
FIG. 2 is a schematic illustration of an exemplary railroad track that cannot accurately be mapped using existing two-dimensional track mapping with a single reference point.

Further, two-dimensional mainline track mapping with single reference point is not capable of accurately mapping multiple railroad tracks that are not parallel. For example, FIG. 2 is a schematic illustration of a railroad 150 that cannot be accurately mapped using two-dimensional mainline track mapping with single reference point. Railroad 150 includes a first track 152, a second track 154, and a loop 156. First and second tracks 152 and 154 each begin at location 158, however, tracks 152 and 154 do not extend substantially parallel downstream from location 158. Rather, track 152 extends generally in the x-direction and track 154 curves and extends in both the x and y-directions. Accordingly, two-dimensional mainline track mapping with single reference point would be insufficient for mapping railroad 150. Specifically, a train traveling on track 152 from location 158 will travel a distance "1000" to location 160, but if the train takes track 154, when measured in the x-direction, the train will appeared to have traveled a distance "1000", but actually would have traveled a longer distance, such as "1200". Moreover, with respect to loop 156, the train will have traveled a distance "3000" to location 162, prior to the train entering loop 156. However, after the same train travels through loop 156 a discontinuity may occur because the train will have traveled a distance greater than "3000', but, as measured in the x-direction, the train will appear to have only traveled a distance "3000" to location 162. Accordingly, mapping railroad tracks can be substantially limiting when using two-dimensional mainline track mapping with single reference point.

Figure 3:
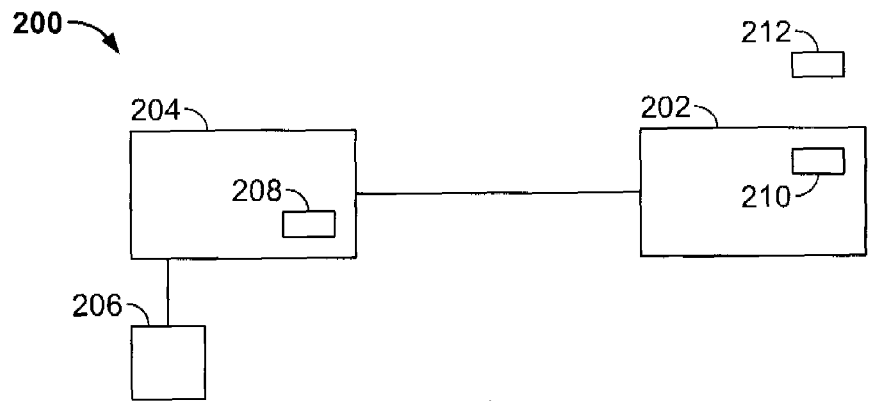
FIG. 3 is a schematic of an exemplary system that may be used to map a railroad track.

FIG. 3 is a schematic of an exemplary system 200 that may be used to map a railroad track, such as, but not limited to, tracks 100 and/or 150 (shown in FIGS. 1 and 2). Specifically, system 200 is configured to map a railroad track in three-dimensions. System 200 includes a positioning system 202 and a computer 204 that includes a database 206 and a processor 208. In the exemplary embodiment, database 206 is electronically coupled directly to computer 204. However, as will be appreciated by one of ordinary skill in the art, in an alternative embodiment, database 206 and computer 204 may be in wireless communication.

In the exemplary embodiment, positioning system 202 is at least one of a global positioning satellite (GPS), a differential GPS, and/or an inertial navigation system. Further, in the exemplary embodiment, positioning system 202 includes a receiver 210 that receives signals from at least one satellite 212. As a result, in one embodiment, receiver 210 may be positioned on a train or car that is moveable along the railroad tracks and receiver 210 may still continually transmit railroad mapping data to computer 204 at a centralized location.

During operation, the coordinates of each location of the railroad track are continually transmitted by positioning system 202 to computer 204 and stored as data in database 206. After receiving a plurality of different track location coordinates, processor 208 generates a map of the railroad track based on the data stored in database 206. More specifically, in the exemplary embodiment, as described below, processor 206 generates a multi-dimensional map.

Figure 4:
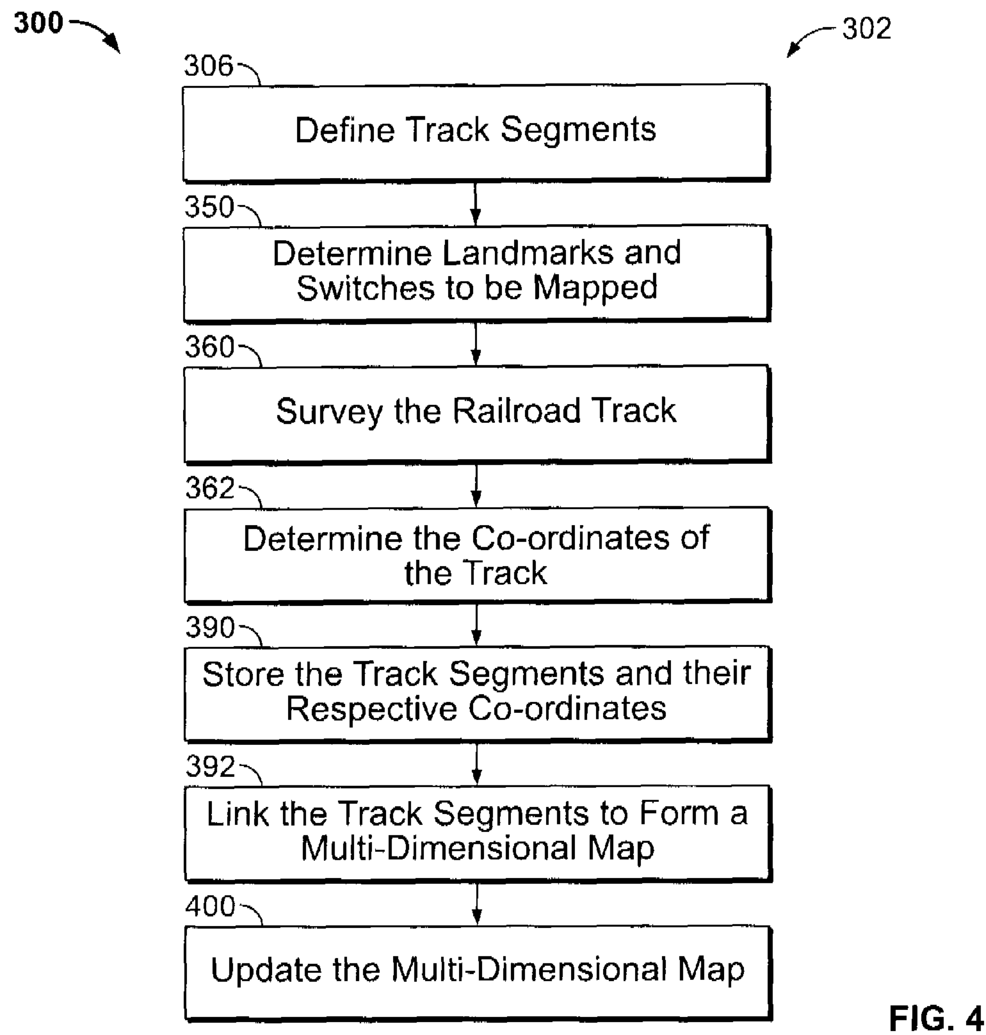
FIG. 4 is a flowchart of an exemplary method that may be used to map a railroad track using the system shown in FIG. 3.
Figure 5:
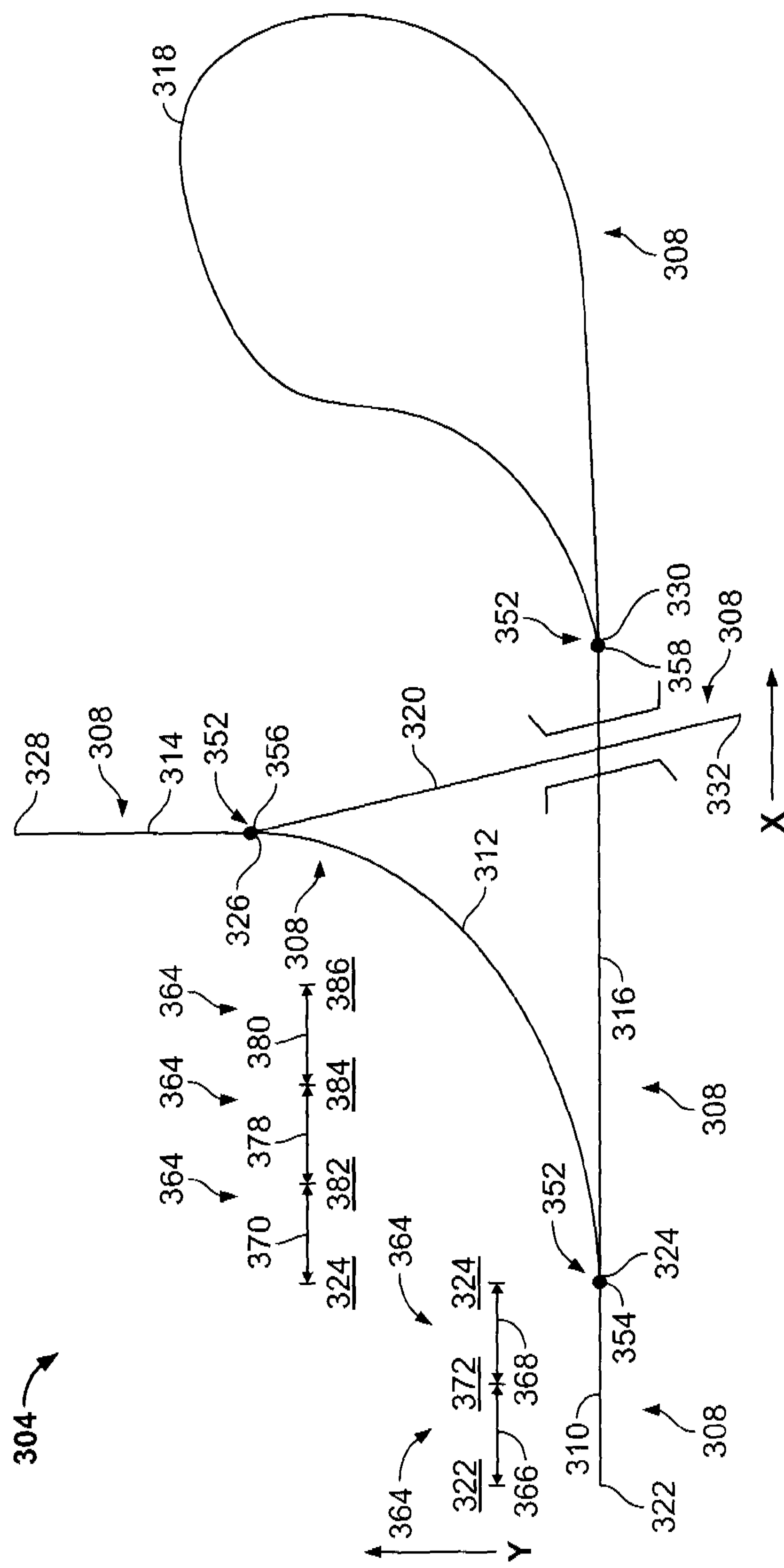
FIG. 5 is a schematic of an exemplary railroad track that can be mapped using the method illustrated in FIG. 4.

FIG. 4 is a flowchart 300 of an exemplary method 302 that may be used to map a railroad track, such as, but not limited to, tracks 100 and 150 (shown in FIGS. 1 and 2), using system 200. FIG. 5 is a schematic of an exemplary railroad track 304 that can be mapped using method 302. In the exemplary embodiment, the method 302 includes defining 306 track segments 308. For example and referring to FIG. 5, railroad track 304 is divided into six segments 310, 312, 314, 316, 318, and 320. Specifically, segment 310 extends between locations 322 and 324, segment 312 extends between locations 324 and 326, segment 314 extends between locations 326 and 328, segment 316 extends between locations 324 and 330, segment 318 is a loop that begins and ends at location 330, and segment 320 extends between locations 326 and 332, and crosses over segment 316. In the exemplary embodiment, the method 302 also includes determining 350 relevant geographic landmarks and/or switches 352 that will be mapped along with track segments 308. For example, in the exemplary embodiment, railroad 304 includes a first switch 354 that is positioned between track segments 310 and 316, a second switch 356 that is positioned between track segments 312 and 314, and a third switch 358 that is positioned between track segments 316 and 318.

In one embodiment, track segments 308 are defined 306 based on directional transitions of railroad track 304. For example track segments 308 may include at least one of a curved section of track, a substantially linear section of track, a turning track, a loop, and/or a siding. In another embodiment, track segments 308 are defined 306 in relation to the landmarks and switches 352 positioned along railroad 304. Moreover, in another embodiment, track segments 308 are manually defined by an operator. In an alternative embodiment, track segments 308 are defined by processor 208 (shown in FIG. 3) and/or a software program.

In the exemplary embodiment, the method 302 also includes surveying 360 the railroad track 304. In one embodiment, railroad track 304 is manually surveyed by an operator traveling along railroad track 304. In an alternative embodiment, receiver 210 (shown in FIG. 3) is positioned on a train or car that travels along railroad track 304 to perform surveying.

Accordingly, during surveying, the coordinates of each track segment 308 are determined 362 using positioning system 202. In the exemplary embodiment, the coordinates include the longitude and latitude of each track segment 308.

In one embodiment, and at a minimum, the coordinates at each end of each track segment 308 must be determined 362. Alternatively, a plurality of coordinates are determined 362 on each track segment 308 to form a plurality of maps 364 within each track segment 308. For example, as illustrated in FIG. 5, track segment 310 is divided into a first map 366 and a second map 368. Specifically, map 366 is defined between the coordinates at locations 322 and 372, and map 368 is defined between the coordinates at locations 372 and 324. Similarly, track segment 312 is divided into a first map 370, a second map 378, and a third map 380. Specifically, map 370 is defined between the coordinates at locations 324 and 382, map 378 is defined between the coordinates at locations 382 and 384, and map 380 is defined between the coordinates at locations 384 and 386. In the exemplary embodiment, the coordinates of each landmark/switch 352 are also determined 362 by positioning system 202.

The coordinates of each track segment 308 are then stored 390 in database 206 (shown in FIG. 3) as map segments. Moreover, the coordinates of each landmark/switch 352 are also stored in database 206. Specifically the map segments and the coordinates of each landmark/switch 352 are stored such that the map segments and landmarks/switched can be linked 392 by processor 208 to form a multi-dimensional map that is stored in database 206. Specifically, in one embodiment, the map segments are linked 392 together based on common coordinates. For example, track segments 310 and 312 each include common coordinates at location 324. Accordingly, the map segments corresponding to track segments 310 and 312 are linked 392 based on the common coordinates at location 324.

Further, in one embodiment, at least one property associated with each switch 352 is also stored 390 in database 206. For example, the property may include a record of each track segment 308 that couples to switch 352. Accordingly, in one embodiment, track segments 308 are linked based on the properties associated with each switch 352. In the exemplary embodiment, as illustrated in FIG. 5, switch 352 connects track segments 312, 314, and 320. Accordingly, based on the properties associated with switch 352, processor 208 would connect track segments 312, 314, and 320 to form the multi-dimensional map.

Moreover, in one embodiment, to determine 362 the coordinates of each track segment 308 an elevation of each track segment 308 relative to a predetermined point is also determined. For example, the elevation of each track segment 308 may be relative to a predetermined altitude. Accordingly, processor 208 is also programmed to create a multi-dimensional map having track segments that cross above or below each other, as is illustrated by track segments 316 and 320 in FIG. 5.

In the exemplary embodiment, the method 302 also includes updating 400 the multi-dimensional map stored in database 206. Specifically, over time the physical position of each track segment 308 and/or landmark/switch 352 may change, become altered, and/or may require updating in database 206. More specifically, track segments 308 and/or landmarks/switches 352 may change position as a result of physical movement of track segments 308 and/or landmarks/switches 352, maintenance, track updates, repairs, and/or environmental conditions, such as thawing of the ground and movement in permafrost regions and/or movement of tectonic plates, for example.

As the location of each track segment 308 and/or landmark/switch 352 changes with respect to a previously recorded position, a determination of a train's position may become inaccurate. For example, the train may be incorrectly reported to be in a different block, over a switch, on a different parallel track, and/or on a different siding. Accordingly, the method 302 includes updating 400 the multi-dimensional map stored in database 206 by determining the current coordinates of a track segment 308 and comparing the current coordinates of the track segment 308 to coordinates previously stored in the database to determine if a current position of the track segment 308 has changed. Any changes detected in the coordinates are stored in database 206 to form an updated multi-dimensional map.

In one embodiment, an averaging function (not shown) is used to provide incremental accuracy of the updated coordinates. For example, the function may include, but is not limited to including, a least square approximation and/or a linear weighting function. The multidimensional map is then updated based on a predetermined threshold. Specifically, if the movement of a track segment 308 and/or landmark/switch 352 exceeds the threshold, the map is updated. The map may be updated by updating only a single track segment 308, or alternatively, the map is updated by updating any number of track segments 308. In one embodiment, the map may be updated periodically based on an amount of elapsed time. Alternatively, the map is updated on an ongoing basis.

In one embodiment, a method for mapping a railroad track is provided. The method includes defining a plurality of track segments that form the railroad track and determining coordinates of each track segment. The method also includes storing the coordinates of each track segment in a database as map segments and linking the map segments stored in the database to create a multi-dimensional railroad track map. In one embodiment, the track segments include at least one of a curved section of track, a substantially linear section of track, a turning track, a loop, and a siding.

In another embodiment, the method includes determining coordinates of switches positioned between adjacent track segments and linking the map segments together based on the coordinates of the switches. In a further embodiment, the method includes determining current coordinates of a track segment, comparing the current coordinates of the track segment to coordinates stored in the database to determine if a current position of the track segment has changed, and updating the multi-dimensional map based on a change in the current position of the track segment. In yet another embodiment, the method includes determining a longitude, latitude, and elevation of each track segment.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for mapping a railroad track are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method for mapping a railroad track, said method comprising: the following steps carried out by a processor:

defining a plurality of track segments that form the railroad track;

determining coordinates of each track segment, and landmarks and switches positioned between adjacent track segments;

storing the coordinates of each track segment in a database as map segments;

linking the map segments stored in the database to create a multi-dimensional railroad track map, and based on the coordinates of the landmarks and switches;

determining current coordinates of the track segment;

comparing the current coordinates of the track segment to coordinates stored in the database to determine if a current position of the track segment has changed;

updating the multi-dimensional map based on a change in the current position of the track segment; and defining the plurality of track segments by changes in direction of the railroad track.

2. A method in accordance with claim 1 wherein defining a plurality of track segments further comprises defining a plurality of track segments that include at least one of a curved section of track, a substantially linear section of track, a turning track, a loop, and a siding.

3. A method in accordance with claim 1 wherein determining coordinates of each track segment further comprises determining at least one of a longitude, a latitude, and an elevation of the track segment.

4. A computer program embodied on a non-transitory computer-readable medium, said computer program comprising at least one code segment configured to instruct a computer to:

determine coordinates of a plurality of track segments that form a railroad track and of the landmarks and switches positioned between adjacent track segments, wherein the plurality of track segments are defined by changes in direction of the railroad track and are defined in relation to landmarks and switches positioned along the railroad track;

store the coordinates of each track segment in a database as map segments;

link the map segments together to create a multi-dimensional railroad track map based on the coordinates of the plurality of track segments and on the coordinates of the landmarks and switches;

update the multi-dimensional map based on a change in the current position of the track segment; and compare the current coordinates of a track segment to coordinates stored in a database to determine if a current position of the track segment has changed.

5. A computer program in accordance with claim 4 wherein said computer program further comprises at least one code segment configured to instruct a computer to determine at least one of a longitude, a latitude, and an elevation of the track segment.

* * * * *

UNITED STATES PATENT AND TRADEMARK OFFICE

CERTIFICATE OF CORRECTION

PATENT NO. : 8,406,940 B2
APPLICATION NO. : 11/971709
DATED : March 26, 2013
INVENTOR(S) : Otsubo et al.

It is certified that error appears in the above-identified patent and that said Letters Patent is hereby corrected as shown below:

On the Title Page, in Item (75), under “Inventors”, in Column 1, Lines 6-7, delete “Lees Summit,” and insert -- Lee’s Summit --, therefor.

In the Specifications:

In Column 3, Line 30, delete “way no know” and insert -- way to know --, therefor.

In Column 3, Line 57, delete ““3000’” and insert -- “3000”, --, therefor.

In Column 4, Lines 21-22, delete “processor 206” and insert -- processor 208 --, therefor.

In Column 6, Line 15, delete “multidimensional” and insert -- multi-dimensional --, therefor.

Signed and Sealed this
Twentieth Day of August, 2013

Teresa Stanek Rea
*Acting Director of the United States Patent and Trademark Office*